May 16, 1950  E. J. ZIEGLER  2,507,845
VEHICLE FRAME
Filed July 19, 1946  2 Sheets-Sheet 1
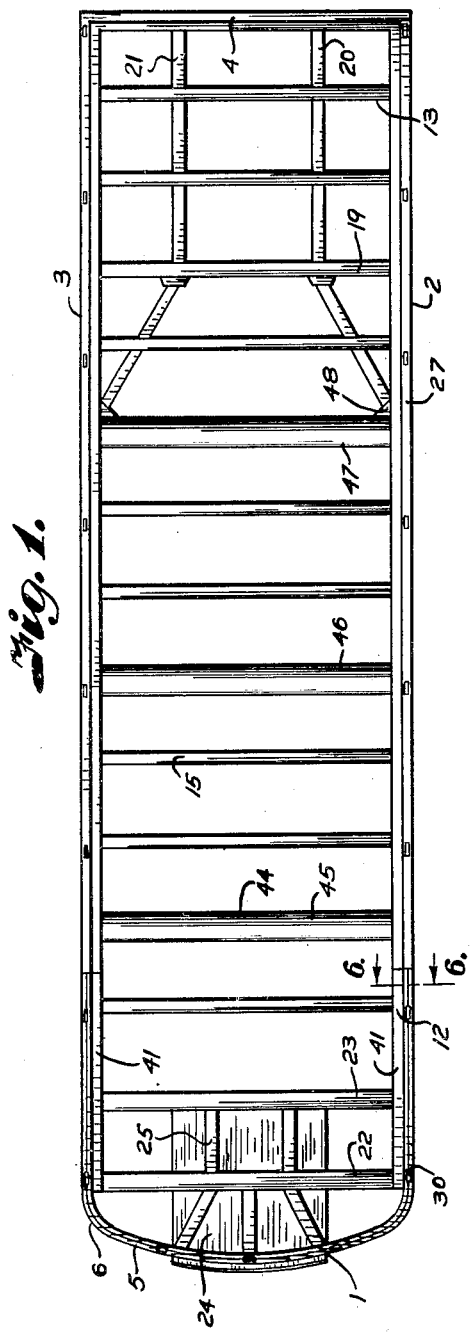
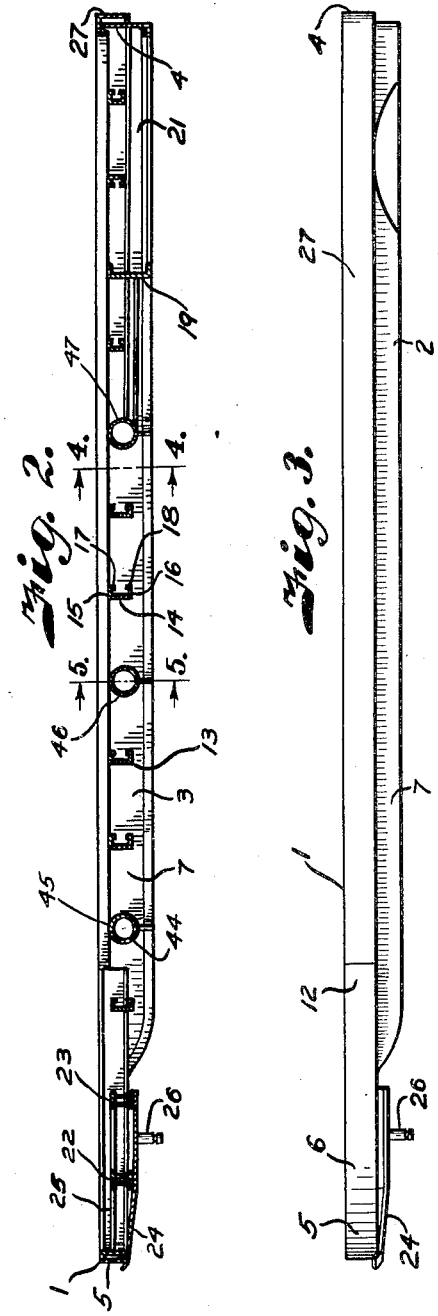
INVENTOR.
Edward J. Ziegler
BY
Fishburn & Mullendore
ATTORNEYS.

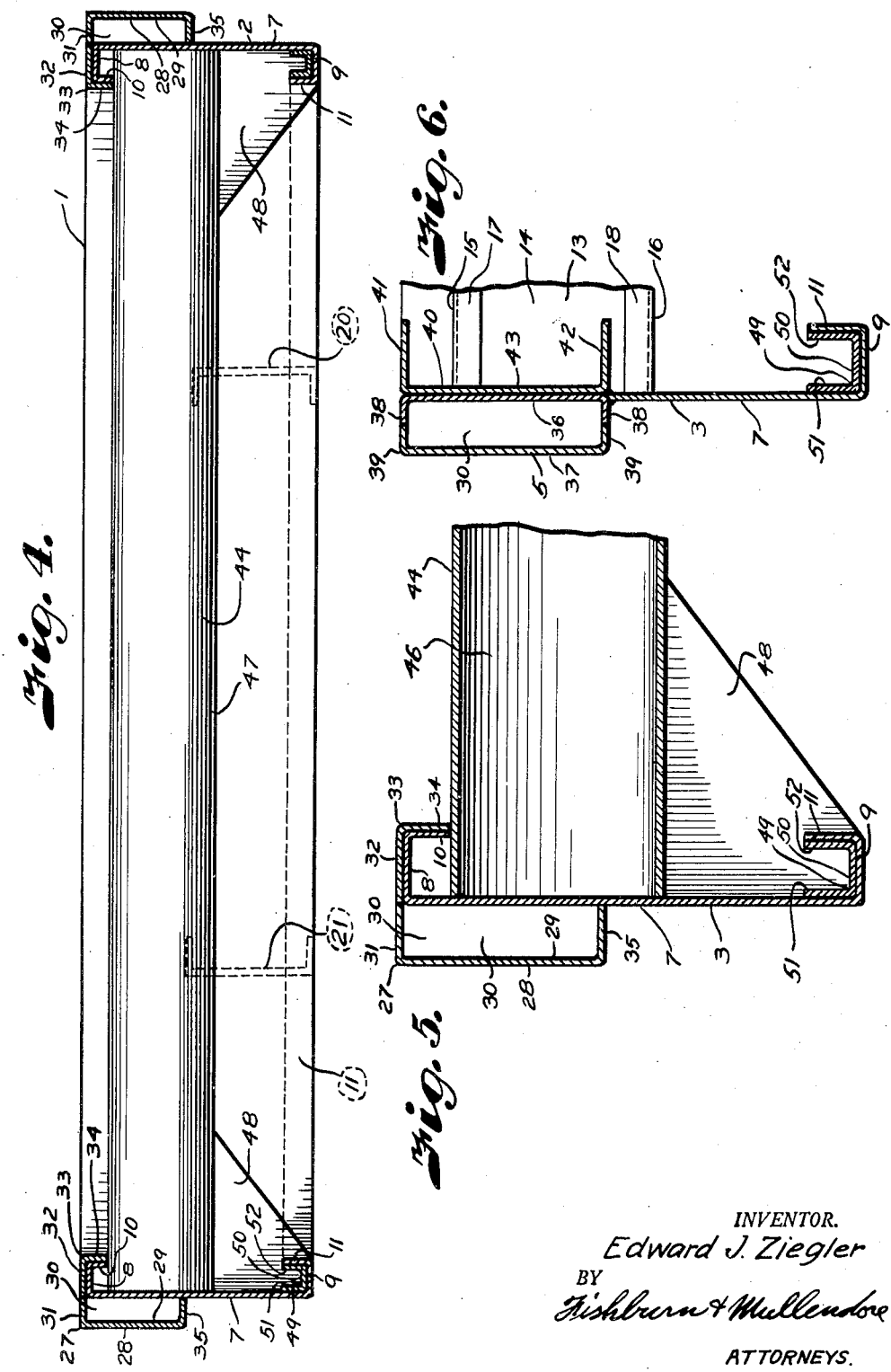

Patented May 16, 1950

2,507,845

UNITED STATES PATENT OFFICE 2,507,845

VEHICLE FRAME

Edward J. Ziegler, Kansas City, Mo.

Application July 19, 1946, Serial No. 684,721

6 Claims. (Cl. 280—106)

This invention relates to vehicles and particularly to the frames of trailers used in motor transportation of freight and the like. Such trailers are of large capacity and carry heavy loads so that the frames must be of substantial construction and strength to withstand torsional strains caused by uneven roadways, uneven loading and shifting of the load as in the case of transportation of livestock.

It has previously been the practice to construct such frames of heavy structural members supported upon heavy weight longitudinal sills; consequently, trailers constructed previous to the present invention have a high center of gravity and too large a part of the total load pulled by the tractor vehicle is dead weight. This is particularly true since most highway load restrictions limit the total weight that can be transported on the respective wheels of the vehicle.

It is, therefore, the principal objects of the present invention to provide a trailer frame of strong, light-weight construction capable of withstanding torsional strains and carrying greater pay loads; to provide a trailer frame constructed for supporting the required load and transmitting draft forces without the use of heavy longitudinal undersills; and to provide a frame with relatively light-weight torsion resisting members incorporated into the frame and which may be substituted for two or more of the transverse floor supporting members.

In accomplishing these and other objects of the invention hereinafter pointed out, I have provided improved structure, the preferred form of which is illustrated in the accompanying drawings wherein:

Fig. 1 is a plan view of a trailer frame constructed in accordance with the present invention.

Fig. 2 is a longitudinal central section through the frame particularly illustrating an arrangement of torsion resisting members.

Fig. 3 is a side elevational view of the frame.

Fig. 4 is an enlarged cross section through the frame on the line 4—4 of Fig. 2.

Fig. 5 is a further enlarged fragmentary section through one side of the frame and showing one of the torsion resisting members, the section being taken on the line 5—5 of Fig. 2.

Fig. 6 is a similar fragmentary section through one side of the frame on the line 6—6 of Fig. 1.

Referring more in detail to the drawings:

1 designates a trailer frame constructed in accordance with the present invention and which includes longitudinal side members 2 and 3 interconnected at the rear ends by a transverse member 4 and at the forward ends by an arcuate member 5 of channel-shaped section and which joins with the side members in curves 6. The side members 2 and 3 and the rear members 4 are of substantially the same construction and have web portions 7 of sufficient depth to carry the required load for which the trailer is designed and connecting inwardly extending flanges 8 and 9 which have lateral facing terminals 10 and 11 substantially parallel with the web 7 and cooperating therewith to enhance rigidity of the flanges 8 and 9. The rear member is joined to the ends of the side member in suitable manner to provide rigid connections for example, by welding.

The upper portion of the forward ends of the side members are cut away to fit the ends 12 of the front member 5 and which are welded thereto. Extending transversely of the side members intermediate the webs thereof is a series of transverse floor supporting members 13 located at suitable spacing along the length of the side members to support the floor loads to be carried. The members 13 are also preferably of sheet metal and bent to substantially channel-shaped cross section to provide vertical webs 14, upper and lower flanges 15 and 16 and terminals 17 and 18 on the outer edges of the flanges substantially corresponding in form to the side members. The ends of the cross members are suitably secured; for example, by welding them to the inner faces of the webs of the side members with the upper flanges 15 located at the desired level for supporting a floor material (not shown). In the illustrated instance the cross members are in substantial contact with the edges of the terminals 10 as best shown in Fig. 5.

Interposed between selected transverse floor supporting members at the rear of the frame and cooperating with the rear frame member 4, is a transverse channel 19 to carry relatively short intermediate longitudinal members 20 and 21 which are located within the depth of the side and rear members for attaching the rear wheel assembly of the trailer (not shown).

The forward portion of the frame carries the conventional fifth wheel mounting including transverse members 22 and 23 which are interconnected by longitudinal braces 25 above a plate 24 forming a part of a fifth wheel mounting. The plate 24 carries the usual king pin 26 that forms the upper part of the pivot with which the trailer is connected to its tractor vehicle as in the present practice.

Extending about the upper marginal portions of the sides and rear of the frame is a rail 27 including an outer member 28 of channel shape including a web 29 spaced from the web 7 of the longitudinal and front and rear transverse members to accommodate stake pockets 30 therebetween, if stake pockets are required. The web portion 29 has an upper flange 31 abutting a flange 32 of an angle 33 that overlies the upper flanges 8 and which has a depending flange 34 backing the upper terminal flanges of the side and front and rear members of the frame as best shown in Fig. 5. The flange 31 is of sufficient width to offset the web 29 a sufficient distance to provide the desired width of the stake pocket. The lower edges of the webs 29 have flanges 35 welded to the web 7 to maintain parallel relationship of the webs as shown in Fig. 5. The upper flanges 31 may be provided with suitable openings along the length thereto to pass stakes or to secure sides of a body (not shown). The front member 5 may be formed of channels 36 and 37 facing each other with the flanges 38 and 39 thereof in registry and welded together to form a continuation of the rail. The backs of the ends of the front member are provided at the forward ends in line with the cutout portions with channels 40 having upper and lower flanges 41 and 42 with a web 43 welded to the ends of the front member.

The structure thus far described is of substantially light-weight and is insufficient to resist the torsional strains caused by uneven roadways, uneven loading or shifting of the load as in the case of transportation of livestock. The frame, therefore, is provided with torsion resisting members 44 extending transversely of the frame between selected transverse members 13 or which may substitute for selected members 13. For example, in the frame illustrated, three torsional resisting members are shown designated 45, 46 and 47, each being of tubular form and preferably of cylindrical cross section since tubular members of cylindrical cross section provide the best structures to resist torsional stress. The tubular members illustrated extend completely across the frame between the webs of the side members and are secured thereto preferably by welding so as to form a unit. The attachment of the torsion resisting members to the side members of the frame may also be reinforced by gusset plates 48 as best indicated in Figs. 4 and 5. The gusset plates are of substantially triangular shape fit within the angles between the webs 7 and tubes and are welded thereto. If desired, the lower flanges of the side and rear members may be further reinforced by channels 49 inset between the terminals on the lower flanges and the web 7 so that the web portions 50 of the channels seat against the lower flanges of the side members and the side flanges 51 and 52 seat against the web 7 and flange terminal 11 respectively whereby they may be readily welded together.

When the frame is constructed as described and provided with the transverse torsion resisting members, the frame is resistant to torsional strains so that the customary longitudinal sills may be eliminated. The frame structure has adequate strength to support the load and provide the draft connection between the rear wheel unit and the fifth wheel connection of the tractor vehicle.

It is thus obvious that I have provided a simple, light-weight frame for trailers which permits a lower center of gravity and allows for greater pay load by reason of the lighter weight construction of the frame.

What I claim and desire to secure by Letters Patent:

1. A vehicle frame including longitudinal side members of channel shape and having vertically arranged webs of substantial depth and inwardly extending flanges, transverse floor supporting members having ends connected with inner faces of the webs by welding, tubular members extending transversely intermediate selected floor supporting members and having ends secured to inner faces of the webs of the side members, and channels extending along outer faces of the side members with flanges inturned and attached to the side members with the lower of said flanges of the last-named channels being attached to the webs of the side members for bracing the webs at the ends of the tubular members.

2. A vehicle frame including longitudinal side members of channel shape and having vertically arranged webs of substantial depth and inwardly extending flanges, transverse floor supporting members having ends connected with inner faces of the webs by welding, tubular members extending transversely intermediate selected transverse floor supporting members and having ends secured to the webs of the side members by welding with upper portions of the tubular members in substantial plane with the floor supporting members, and channels extending along outer faces of the webs of the side members and having upper flanges fixed to the upper edge of the webs and lower flanges attached to outer sides of the webs at substantially the level of the lower edges of the transverse floor supporting members.

3. A frame including longitudinal side members of channel shape and having vertically arranged webs of substantial depth and inwardly extending flanges terminating in laterally turned facing flanges substantially parallel with said webs, floor supporting members extending transversely below the upper lateral flanges and having ends connected with inner faces of the webs by welding, tubular members extending transversely intermediate selected transverse floor supporting members and having ends secured to the webs of the side members below said upper lateral flanges by welding with the upper portions of the tubular members in substantial plane with the floor supporting members, and channels extending along outer sides of said web members and having upper flanges fixed to the upper edge of said webs and lower flanges attached to outer sides of the webs at substantially the level of the lower edge of the transverse supporting members.

4. A frame including longitudinal side members of channel shape and having vertically arranged webs of substantial depth and inwardly extending flanges terminating in laterally turned facing flanges substantially parallel with said webs, floor supporting members extending transversely below the upper lateral flanges and having ends connected with inner faces of the webs by welding, tubular members extending transversely intermediate selected transverse floor supporting members and having ends secured to the webs of the side members below said upper lateral flanges by welding with the upper portions of the tubular members in substantial plane with the floor supporting members, channels extending along outer sides of said web members and having upper flanges fixed to the upper edge of said webs and lower flanges attached to outer sides of the webs at substantially the level of the lower edges of the transverse supporting members, and angles having flanges lapping the upper lateral and inturned flanges of the side members to cooperate with said flanges in stiffening the side members to attaching points of said tubular and transverse floor supporting members.

5. A frame including longitudinal side members of channel shape and having vertically arranged webs of substantial depth and inwardly extending flanges terminating in laterally turned facing flanges substantially parallel with said webs, floor supporting members extending transversely below the upper lateral flanges and having ends connected with inner faces of the webs by welding, tubular members extending transversely intermediate selected transverse floor supporting members and having ends secured to the webs of the side members below said upper lateral flanges by welding with the upper portions of the tubular members in substantial plane with the floor supporting members, channels extending along outer sides of said web members and having upper flanges fixed to the upper edge of said webs and lower flanges attached to outer sides of the webs at substantially the level of the lower edges of the transverse supporting members, angles having flanges lapping the upper lateral and inturned flanges of the side members to cooperate with said flanges in stiffening the side members to attaching points of said tubular and transverse floor supporting members, and gusset plates connecting lower portions of the side members with the tubular members.

6. A frame including longitudinal side members of channel shape and having vertically arranged webs of substantial depth and inwardly extending flanges terminating in laterally turned facing flanges substantially parallel with said webs, floor supporting members extending transversely below the upper lateral flanges and having ends connected with inner faces of the webs by welding, tubular members extending transversely intermediate selected transverse floor supporting members and having ends secured to the webs of the side members below said upper lateral flanges by welding with the upper portions of the tubular members in substantial plane with the floor supporting members, channels extending along outer sides of said web members and having upper flanges fixed to the upper edge of said webs and lower flanges attached to outer sides of the webs at substantially the level of the lower edges of the transverse supporting members, angles having flanges lapping the upper lateral and inturned flanges of the side members to cooperate with said flanges in stiffening the side members to attaching points of said tubular and transverse floor supporting members, stiffening members embraced by the inturned lower and lateral flanges of the side members to stiffen the lower portions of the side members, and gusset plates connecting said stiffened lower edges of the side members with the tubular members.

EDWARD J. ZIEGLER.

REFERENCES CITED

The following references are of record in the file of this patent:

UNITED STATES PATENTS

| Number | Name | Date |
| --- | --- | --- |
| D. 144,900 | Boepple | June 4, 1946 |
| 1,109,613 | Canda | Sept. 1, 1914 |
| 1,493,736 | Collins | May 13, 1924 |
| 1,593,783 | Stresau | July 27, 1926 |
| 1,723,518 | Murray | Aug. 6, 1929 |
| 1,848,895 | MacPherson | Mar. 8, 1932 |
| 2,001,846 | Ledwinka | May 21, 1935 |
| 2,329,408 | Minium | Sept. 14, 1943 |